(12) United States Patent
Sugioka et al.

(10) Patent No.: US 11,964,351 B2
(45) Date of Patent: Apr. 23, 2024

(54) SCREW FASTENING FAILURE DETERMINATION DEVICE, SCREW FASTENING DEVICE, SCREW FASTENING FAILURE DETERMINATION METHOD, AND NON-TRANSITORY COMPUTER READABLE MEDIUM

(71) Applicant: OMRON Corporation, Kyoto (JP)

(72) Inventors: Masayuki Sugioka, Kusatsu (JP); Tatsuya Sasaki, Otsu (JP); Koji Nishigaki, Kusatsu (JP); Takanori Shibutani, Otsu (JP)

(73) Assignee: OMRON Corporation, Kyoto (JP)

( * ) Notice: Subject to any disclaimer, the term of this patent is extended or adjusted under 35 U.S.C. 154(b) by 419 days.

(21) Appl. No.: 17/438,463

(22) PCT Filed: Feb. 17, 2020

(86) PCT No.: PCT/JP2020/006046
§ 371 (c)(1),
(2) Date: Sep. 12, 2021

(87) PCT Pub. No.: WO2020/195325
PCT Pub. Date: Oct. 1, 2020

(65) Prior Publication Data
US 2022/0126409 A1   Apr. 28, 2022

(30) Foreign Application Priority Data

Mar. 27, 2019 (JP) ................................. 2019-061729
Jul. 31, 2019 (JP) ................................. 2019-141181

(51) Int. Cl.
*B23P 19/00* (2006.01)
*B23P 19/06* (2006.01)

(52) U.S. Cl.
CPC .................................... *B23P 19/06* (2013.01)

(58) Field of Classification Search
CPC ........................................................ B23P 19/06
(Continued)

(56) References Cited

U.S. PATENT DOCUMENTS 3,708,736 A * 1/1973 Hoshina ............... G05B 19/232
                                                           318/632
3,886,424 A * 5/1975 Hoshina ............... G05B 19/231
                                                           318/630
(Continued)

FOREIGN PATENT DOCUMENTS

CN       102922271       2/2013
CN       104661796       5/2015
(Continued)

OTHER PUBLICATIONS

Office Action of China Counterpart Application, with English translation thereof, dated Mar. 1, 2023, pp. 1-18.
(Continued)

*Primary Examiner* — Max H Noori
(74) *Attorney, Agent, or Firm* — JCIPRNET

(57) ABSTRACT

Provided is a technique capable of suitably determining screw fastening failure. A screw fastening failure determination device (10) includes: a speed acquisition unit (13) which acquires an axial speed of a screw driver or a speed feature value relating to the speed; and a failure determination unit (14) which determines, in a temporary seating process, that a screw fastening has failed on the basis of the axial speed or the speed feature value at a prescribed timing.

13 Claims, 5 Drawing Sheets

(58) Field of Classification Search
USPC .................................................... 73/862.23
See application file for complete search history.

(56) References Cited

U.S. PATENT DOCUMENTS

| | | | |
|---|---|---|---|
| 7,458,282 | B1 | 12/2008 | Wuester, Sr. et al. |
| 11,846,512 | B1 * | 12/2023 | Meyer ................. G01C 21/3691 |
| 11,846,685 | B1 * | 12/2023 | Pelliccione ......... G01R 33/0017 |
| 11,848,979 | B1 * | 12/2023 | Korobov ............... H04L 67/025 |
| 2019/0017580 | A1 * | 1/2019 | Curtis ................. F16H 25/2209 |
| 2021/0046593 | A1 * | 2/2021 | Eguchi .............. B29C 66/83221 |

FOREIGN PATENT DOCUMENTS

| | | |
|---|---|---|
| CN | 207139234 | 3/2018 |
| JP | H06320357 | 11/1994 |
| JP | 2003191174 | 7/2003 |
| JP | 2012171071 | 9/2012 |
| JP | 2012223841 | 11/2012 |
| JP | 2013018067 | 1/2013 |
| JP | 2013031888 | 2/2013 |
| JP | 5824354 | 11/2015 |
| JP | 6045465 | 12/2016 |

OTHER PUBLICATIONS

"International Search Report (Form PCT/ISA/210) of PCT/JP2020/006046," dated Apr. 14, 2020, with English translation thereof, pp. 1-4.

"Written Opinion of the International Searching Authority (Form PCT/ISA/237) of PCT/JP2020/006046," dated Apr. 14, 2020, with English translation thereof, pp. 1-6.

"Search Report of Europe Counterpart Application", dated Nov. 8, 2022, pp. 1-5.

* cited by examiner

SCREW FASTENING FAILURE DETERMINATION DEVICE, SCREW FASTENING DEVICE, SCREW FASTENING FAILURE DETERMINATION METHOD, AND NON-TRANSITORY COMPUTER READABLE MEDIUM

CROSS-REFERENCE TO RELATED APPLICATION

This application is a 371 application of the International PCT application serial no. PCT/JP2020/006046, filed on Feb. 17, 2020, which claims the priority benefits of Japan Patent Application No. 2019-061729, filed on Mar. 27, 2019 and Japan Patent Application No. 2019-141181, filed on Jul. 31, 2019. The entirety of each of the above-mentioned patent applications is hereby incorporated by reference herein and made a part of this specification.

BACKGROUND

Technical Field

The present invention relates to a screw fastening failure determination device, a screw fastening device, a screw fastening failure determination method, and a control program.

Related Art

Conventionally, a technique is known in which the presence/absence of a fastening component is determined on the basis of the movement distance of a bit during the measurement set time from an arbitrarily set measurement start position in a screw fastening device including an electric screw driver that is axially moved in an up-down direction (for example, see Patent literature 1).

In addition, a technique is known in which the presence/absence of the fastening component is determined on the basis of the thrust acting on the bit after the bit reaches a determination start set point that is a position where the front end of the bit does not abut against an object to be fastened or a fastening portion (for example, see Patent literature 2).

LITERATURE OF RELATED ART

Patent Literature

Patent literature 1: Japanese Patent Laid-Open No. 2012-223841 (published on Nov. 15, 2012)
Patent literature 2: Japanese Patent Laid-Open No. 2013-18067 (published on Jan. 31, 2013)

SUMMARY

Problems to be Solved

However, in the technique described in Patent literature 1, the presence/absence of the fastening component (screw) is determined on the basis of the movement distance of the bit during the measurement set time from the measurement start position that is arbitrarily set. In order to avoid erroneous determination, it is necessary to increase the difference between a movement distance when there is a screw and a movement distance when there is no screw. However, the position where the front end of the screw held by the bit starts to enter a screw hole is not precisely known due to variations in the screw and the like. Therefore, the measurement set time may also include the time during which the bit moves at a high speed before the screw enters the screw hole. Therefore, in the technique described in Patent literature 1, it is necessary to set a long measurement set time. Then, the determination of the presence/absence of the screw may be delayed, and the bit may collide with the object to be fastened. In addition, the shorter the screw, the more difficult it is to determine the presence/absence of the screw.

In addition, the change in the thrust acting on the bit is easily affected by external factors such as the material properties, the tolerances and the like of the object to be fastened and the fastening component. The technique described in Patent literature 2 has a problem that the presence/absence of the fastening component may be erroneously determined.

One aspect of the present invention aims to provide a technique that can suitably determine screw fastening failure.

Means to Solve Problems

In order to solve the above problems, a screw fastening failure determination device according to one aspect of the present invention includes: a speed acquisition unit which acquires an axial speed of a screw driver or a speed feature value relating to the speed; and a failure determination unit which determines, in a temporary seating process in which the screw driver is made to move to a screw hole side and a screw is inserted into the screw hole, whether or not screw fastening fails on the basis of the axial speed or the speed feature value at a prescribed timing.

In addition, in order to solve the above problems, a screw fastening failure determination method according to one aspect of the present invention includes: a speed acquisition step in which an axial-direction speed of a screw driver or a speed feature value relating to the speed is acquired; and a failure determination step in which in the temporary seating process where the screw driver is made to move to a screw hole side and the screw is inserted into the screw hole, whether or not screw fastening fails is determined on the basis of the speed feature value in the axial direction at a prescribed timing.

Effect

According to one aspect of the present invention, screw fastening failure can be suitably determined.

DESCRIPTION OF THE EMBODIMENTS

Hereinafter, an embodiment according to one aspect of the present invention (hereinafter, also referred to as "the embodiment") is described on the basis of the drawings.

§ 1 APPLICATION EXAMPLE

Figure 1:
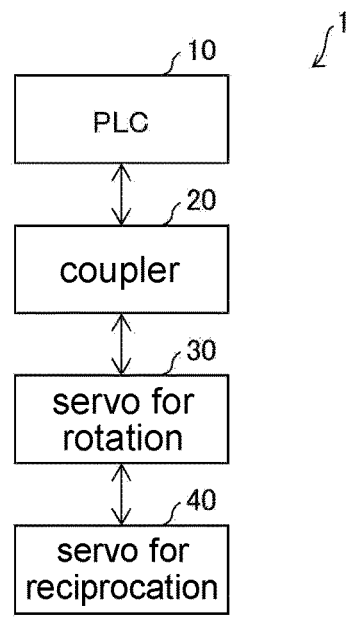
FIG. 1 is a block diagram showing the outline of a screw fastening system according to an embodiment of the present invention.

FIG. 1 is a block diagram showing the outline of a screw fastening device 1 according to an embodiment of the present invention. As shown in FIG. 1, the screw fastening device 1 includes: a programmable logic controller (PLC) 10 (screw fastening failure determination device), a coupler 20, a servo for rotation 30 (a first motor), and a servo for reciprocation 40 (a second motor). The screw fastening device 1 performs a screw fastening operation by a rotation motion around an axis and a reciprocation motion in an axial direction of a screw driver 50 (see FIG. 3) described later. At this time, the PLC 10 controls the screw fastening operation and determines the occurrence of failure in the screw fastening operation.

In the specification, the failure in the screw fastening operation refers to a state of "no screw" in which the screw does not exist at the front end of the screw driver bit at the start timing of the screw fastening operation, for example, the screw is dropped before the start of the screw fastening. The PLC 10 determines the occurrence of the failure due to no screw.

The servo for rotation 30 is a motor that makes the screw driver 50 perform the rotation motion around the axis (motion in an R-axis direction). In addition, the servo for rotation 30 outputs, to the coupler 20, the rotation speed (deg./s), rotation amount (deg.), and rotation torque (a ratio (%) with respect to a rated torque) of the servo for rotation 30.

The servo for reciprocation 40 is a motor that makes the screw driver 50 perform the reciprocation motion in the axial direction (motion in a Z-axis direction). In addition, the servo for reciprocation 40 outputs, to the coupler 20, the movement speed (mm/s), movement position (mm), and movement torque (a ratio (%) with respect to a rated torque) of the screw driver 50 determined by the rotation of the servo for reciprocation 40.

The coupler 20 connects the PLC 10 with the servo for rotation 30 and the servo for reciprocation 40. Specifically, the coupler 20 transmits a control signal received from the PLC 10 to the servo for rotation 30 and the servo for reciprocation 40. In addition, the coupler 20 transmits, to the PLC 10, the rotation speed, rotation amount, and rotation torque of the servo for rotation 30 received from the servo for rotation 30. In addition, the coupler 20 transmits, to the PLC 10, the movement speed, movement position, and movement torque of the screw driver 50 determined by the rotation of the servo for reciprocation 40, which are received from the servo for reciprocation 40.

In the following description, the rotation speed, rotation amount, and rotation torque of the servo for rotation 30, and the movement speed, movement position, and movement torque of the screw driver 50 determined by the rotation of the servo for reciprocation 40 may be collectively referred to as parameters.

Figure 2:
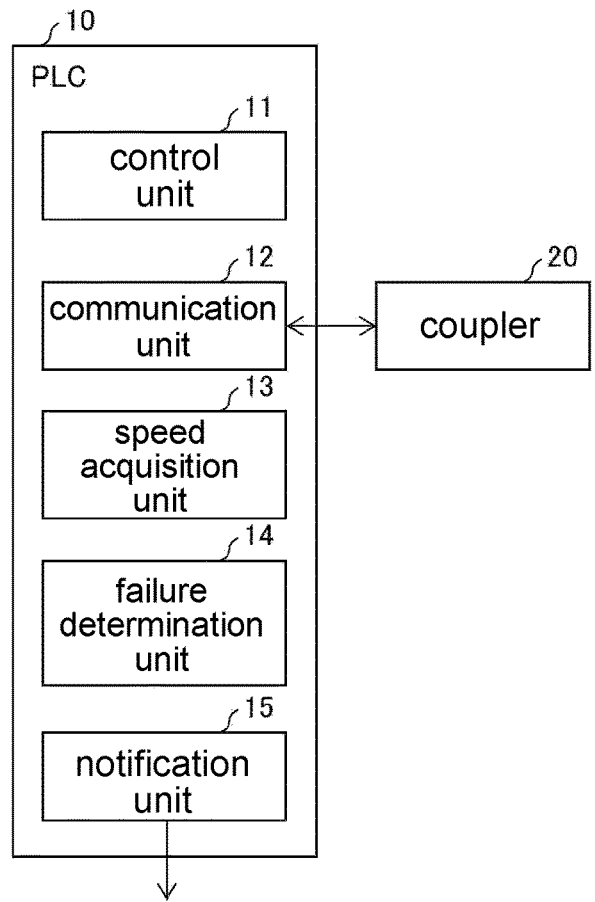
FIG. 2 is a block diagram showing the configuration of a PLC.

FIG. 2 is a block diagram showing the configuration of the PLC 10. The PLC 10 controls the operation of the screw fastening device 1. As shown in FIG. 2, the PLC 10 includes a control unit 11, a communication unit 12, a speed acquisition unit 13, a failure determination unit 14, and a notification unit 15.

The control unit 11 outputs, to the communication unit 12, a control signal for controlling the servo for rotation 30 and the servo for reciprocation 40. The communication unit 12 transmits, to the coupler 20, the control signal input from the control unit 11. The control signal is transmitted to the servo for rotation 30 and the servo for reciprocation 40 via the coupler 20 and controls the servo for rotation 30 and the servo for reciprocation 40. The control unit 11 controls the servo for rotation 30 and the servo for reciprocation 40 in synchronization with each other. In addition, the control unit 11 feeds back the parameters of the servo for rotation 30 and the servo for reciprocation 40 to the control of the servo for rotation 30 and the servo for reciprocation 40.

The communication unit 12 receives the parameters from the servo for rotation 30 and the servo for reciprocation 40 via the coupler 20. The communication unit 12 stores the received parameters in a storage device (not shown). In addition, the screw fastening device 1 may include a storage device for storing the received parameters.

With reference to the parameters received by the communication unit 12 from the coupler 20, the speed acquisition unit 13 acquires the movement speed of the screw driver 50 determined by the servo for reciprocation 40. In addition, with reference to the parameters received by the communication unit 12 from the coupler 20, the speed acquisition unit 13 also functions as a position/speed acquisition unit that acquires the rotation speed, rotation amount, and rotation torque of the servo for rotation 30, the axial position and the movement torque. The speed acquisition unit 13 may acquire the parameters from the communication unit 12 or may acquire the parameters from the storage device (not shown).

In addition, each of the servo for rotation 30 and the servo for reciprocation 40 includes a servo screw driver that drives and controls the servo motor, and the servo screw driver may calculate the speed by acquiring a position from the servo motor and differentiating the acquired position. The servo screw driver transmits the position and the speed to the PLC 10 via the coupler 20. The speed acquisition unit 13 acquires the position and the speed received by the communication unit 12 from the coupler 20.

With reference to the axial speed of the screw driver 50 acquired by the speed acquisition unit 13, the failure determination unit 14 determines whether or not the screw fastening fails. Specifically, on the basis of whether or not the axial speed of the screw driver 50 is greater than a prescribed threshold value, the failure determination unit 14 determines whether or not the screw fastening fails.

When the failure determination unit 14 determines that the screw fastening fails, the notification unit 15 notifies the occurrence of the failure. The PLC 10 may stop the operation of the servo for rotation 30 and the servo for reciprocation 40 by notifying the coupler 20 of the occurrence of the failure by the notification unit 15. In addition, the PLC 10 may be capable of notifying an external equipment of the occurrence of the screw fastening failure by the notification unit 15.

§ 2 CONFIGURATION EXAMPLE

Embodiment 1

Hereinafter, Embodiment 1 of the present invention is described in detail.

(Configuration of Screw Fastening Device 1)

Figure 3:
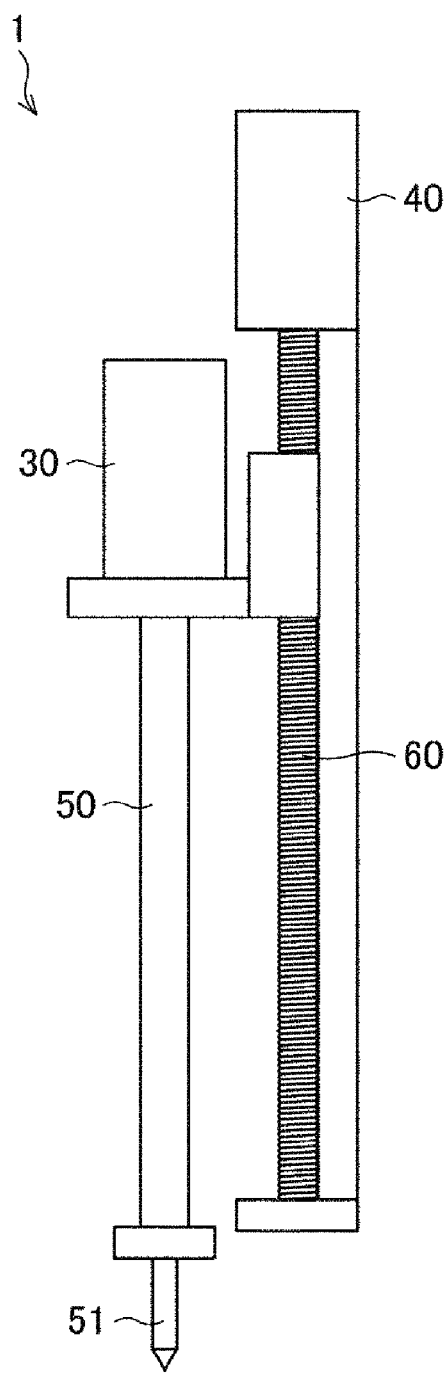
FIG. 3 is a diagram showing the external configuration of the screw fastening system according to the embodiment.

FIG. 3 is a diagram simply showing an external configuration example of the screw fastening device 1 according to the embodiment. As shown in FIG. 3, the screw fastening device 1 includes the servo for rotation 30 (the first motor), the servo for reciprocation 40 (the second motor), the screw driver 50, a ball screw 60, and the PLC 10 and the coupler 20 described above which are not shown in FIG. 3.

The screw driver 50 has a screw driver bit 51 at the front end and performs screw fastening. The screw driver 50 executes the screw fastening operation by moving in the axial direction by the servo for reciprocation 40 while performing the rotation motion around the axis by the rotation torque that is applied by the servo for rotation 30. In the following description, in the axial direction of the screw driver 50, the direction in which the screw driver 50 moves during the course of the screw fastening is referred to as a downward direction.

The servo for rotation 30 is arranged above the screw driver 50 and makes the screw driver 50 perform the rotation motion around the axis.

The ball screw 60 integrally supports the screw driver 50 and the servo for rotation 30 in a way that the screw driver 50 can be moved upward and downward.

The servo for reciprocation 40 is arranged on the upper portion of the ball screw 60 and makes the ball screw 60 perform the rotation motion. The rotation motion of the ball screw 60 generated due to the servo for reciprocation 40 is converted into a linear motion of the screw driver 50 in the up-down direction, and the screw driver 50 performs reciprocation motion upward and downward.

(Screw Fastening Operation)

The screw fastening operation performed by the screw fastening device 1 is as follows.

Firstly, the control unit 11 executes a lowering process in which the screw driver 50 is lowered by the rotation motion of the ball screw 60 so that a screw is installed at a location where the screw fastening of the object to be fastened is performed in a state that the screw is held at the front end of the screw driver bit 51 by, for example, suction. In the lowering process, the control unit 11 lowers the screw driver 50 until the screw is about to enter the screw hole of the object to be fastened. When the Z-axis position of the screw driver 50 reaches a prescribed position, the control unit 11 completes the Z-axis positioning.

Next, the control unit 11 executes a temporary seating process of pressing the screw driver 50 while rotating the screw until the screw is temporarily seated. Here, the temporary seating process is a process until the seat surface of the screw comes into contact with the object to be fastened. At the timing of the completion of temporary seating process, the screw apparently comes into a state of being in the screw hole.

The control unit 11 performs the temporary seating process in which a screw is inserted into the screw hole of the fastening object and temporarily seated until a rotation torque (an R-axis torque) applied to the screw driver 50 reaches a first torque (a prescribed torque) smaller than a fastening torque of the screw. The fastening torque of the screw is a torque that is decided according to JIS or various regulations depending on, for example, the type of screw, and the first torque is, for example, a torque when the rated output of the servo for rotation 30 is 50% or more. The control unit 11 performs the temporary seating process until the screw is temporarily seated.

Meanwhile, at the initial stage of the temporary seating process, the R-axis torque is higher than the torque when the output of the servo for rotation 30 is 50% or more of the rated output at the start of inserting the screw into the screw hole of the fastening object. Therefore, in order to avoid erroneous determination of temporary seating, for example, the control unit 11 does not determine the completion of temporary seating for 1000 ms from the start of the temporary seating process.

Subsequently, the control unit 11 performs a final fastening process of further pressing the screw driver 50 against the screw while rotating the screw after the screw is temporarily seated. The final fastening process after the temporary seating process is performed until the rotation torque applied to the screw driver 50 by the servo for rotation 30 reaches a second torque that is a specified fastening torque. The control unit 11 performs the final fastening process until, for example, the R-axis torque becomes the torque when the output of the servo for rotation 30 is 150% or more of the rated output.

After the final fastening process is completed, the control unit 11 executes a final fastening holding process in which the rotation torque of the servo for rotation 30 and the pressing torque of the servo for reciprocation 40 are held in the final fastening state for a prescribed time. In the final fastening holding process, the control unit 11 holds the final fastening state for 100 milliseconds for example.

After that, the control unit 11 executes a release process in which the rotation of the servo for rotation 30 is stopped and the R-axis torque is set to 0% or less so as to release the screw.

Subsequently, the control unit 11 completes the screw fastening operation by executing an origin return process in which the screw driver 50 is made to move upward by the rotation motion of the ball screw 60 and the Z-axis position of the screw driver 50 is returned to the origin position.

(No-Screw Determination)

Next, processing is described in which the no-screw determination is performed with reference to the axial speed of the screw driver 50.

In the above-described temporary seating process in which the screw driver 50 is made to move to the screw hole side and the screw is inserted into the screw hole, the speed acquisition unit 13 acquires the axial speed of the screw driver 50 from the coupler 20 via the communication unit 12. In addition, the speed acquisition unit 13 may acquire the axial position in addition to the axial speed of the screw driver 50. Here, the axial speed of the screw driver 50 is a speed at which the screw driver 50 moves in the Z-axis direction when the ball screw 60 rotates due to the servo for reciprocation 40. In addition, the axial position of the screw driver 50 is a movement distance of the Z-axis position from the origin position.

On the basis of a speed at a prescribed timing in the temporary seating process, which is the axial speed of the screw driver 50 acquired by the speed acquisition unit 13, the failure determination unit 14 determines whether or not the failure due to no screw occurs.

Figure 4:
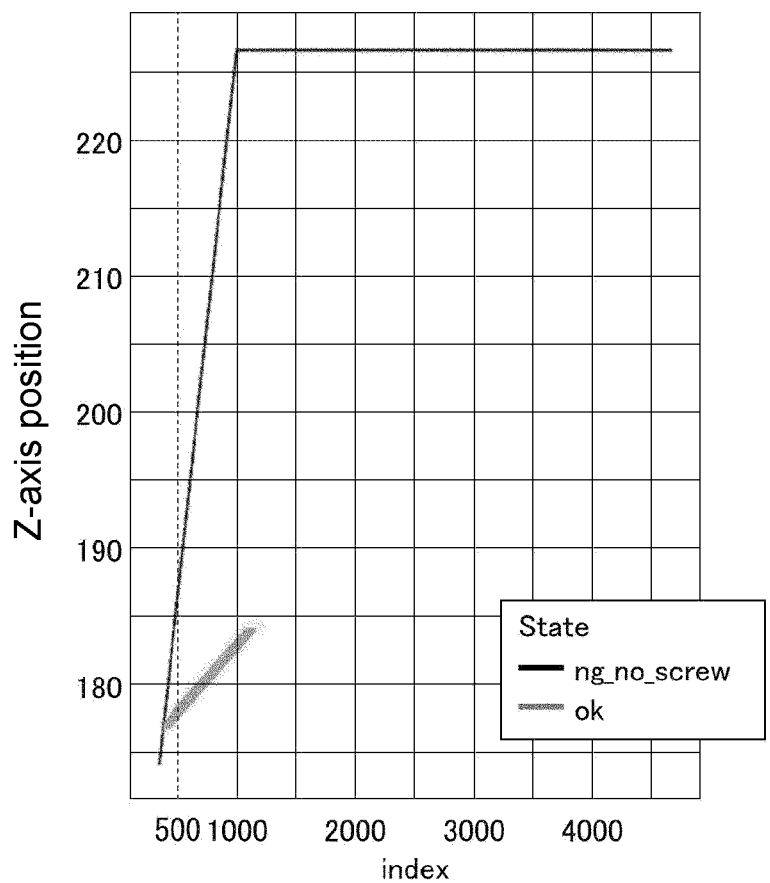
FIG. 4 is a diagram showing the amount of change in the Z-axis position during a temporary seating process.

FIG. 4 is a diagram showing changes in the Z-axis position during the temporary seating process when the failure due to no screw occurs (ng_no_screw) and when the temporary seating process is completed without any problem (ok). The horizontal axis represents time and the vertical axis represents the Z-axis position.

Figure 5:
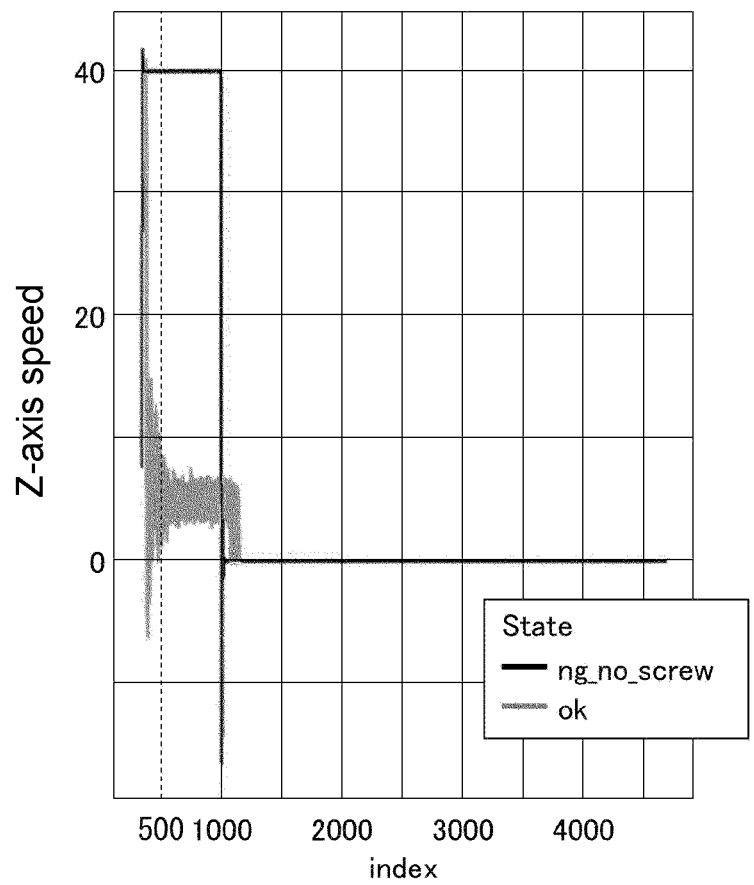
FIG. 5 is a diagram showing the amount of change in the Z-axis speed during the temporary seating process.

FIG. 5 is a diagram showing the Z-axis direction speed during the temporary seating process when the failure due to no screw occurs (ng_no_screw) and when the temporary seating process is completed without any problem (ok). The horizontal axis represents time and the vertical axis represents the Z-axis speed.

Here, in FIGS. 4 and 5, with regard to the index indicating the time on the horizontal axis, 1 index indicates 2 msec, for example, index=1000 is 2 seconds.

As shown in FIG. 4, in the temporary seating process, the Z-axis direction position of the screw driver 50 at a prescribed timing is greater in the case that the screw fastening fails due to no screw than in the case that the screw fastening does not fail due to no screw. However, in the temporary seating process, the Z-axis direction position gradually increases regardless of whether the failure due to no screw occurs or the failure due to no screw does not occur. Therefore, at the early stage of the temporary seating process before the screw driver 50 reaches the object to be fastened, there is little difference between the Z-axis direction position when the failure due to no screw occurs and the Z-axis direction position when the failure due to no screw does not occur.

Thus, it is difficult to suitably determine the occurrence of the failure due to no screw on the basis of the Z-axis direction position at a prescribed timing at the early stage of the temporary seating process.

Thus, in the temporary seating process, the failure determination unit 14 acquires, via the speed acquisition unit 13, the Z-axis speed at a prescribed timing, for example, the timing of index=500 before the front end of the screw driver 50 reaches the portion to be fastened.

As shown in FIG. 5, in the temporary seating process, the Z-axis direction speed of the screw driver 50 at a prescribed timing is higher in the case that the failure due to no screw occurs than in the case that the failure due to no screw does not occur.

At the start of the temporary seating process, regardless of whether the failure due to no screw occurs or the failure due to no screw does not occur, the Z-axis direction speed temporarily becomes the highest speed which is about 40 mm/s in the example of FIG. 5. When the failure due to no screw does not occur, the screw is pressed against the screw hole by the motion of the ball screw 60 and is screwed into the screw hole, and thus the Z-axis direction speed decreases to about 5 mm/s on average immediately after the start of the temporary seating process. On the other hand, when the failure due to no screw occurs, the Z-axis direction speed does not change from the start of the temporary seating process before the front end of the screw driver 50 reaches the object to be fastened (before index=1000).

Therefore, the Z-axis speed at a prescribed timing, for example, the timing of index=500 at the early stage of the temporary seating process before the screw driver 50 reaches the object to be fastened differs greatly in the case that the failure due to no screw occurs and in the case that the failure due to no screw does not occur. Thus, the failure determination unit 14 can suitably determine whether or not the failure due to no screw occurs on the basis of the Z-axis direction speed at a prescribed timing at the early stage of the temporary seating process.

In the temporary seating process, when the axial speed of the screw driver at a prescribed timing is greater than a preset threshold value, the failure determination unit 14 determines that the failure due to no screw occurs in the screw fastening. The threshold value for determining the occurrence of the failure due to no screw can be set to a suitable speed on the basis of the Z-axis direction speed during the temporary seating process when the failure due to no screw does not occur. In the example shown in FIG. 5, when the Z-axis speed at the timing of index=500 is greater than 30 mm/s, the failure determination unit 14 may determine that the screw fastening failure due to no screw occurs. Accordingly, the failure determination unit 14 can determine the screw fastening failure with high precision.

In the temporary seating process, when the axial speed of the screw driver at a prescribed timing is equal to or smaller than the preset threshold value, the failure determination unit 14 determines that the failure due to no screw does not occur in the screw fastening. In this case, the control unit 11 continues the screw fastening.

When the failure determination unit 14 determines that the failure in which the screw does not exist at the front end of the screw driver 50 occurs in the screw fastening, the PLC 10 notifies the user or another machine of the occurrence of the failure by the function of the notification unit 15.

In addition, when the failure determination unit 14 determines that the failure occurs in the screw fastening, the PLC 10 stops the screw fastening operation. As described above, the failure determination unit 14 can determine that the failure due to no screw occurs at the early stage of the temporary seating process before the screw driver 50 reaches the object to be fastened, and thus the screw fastening operation can be stopped before the screw driver 50 reaches the object to be fastened even when the screw driver 50 is driven at a high speed.

Other Embodiments

In the above Embodiment 1, an example is described in which the screw fastening failure is determined on the basis of the axial speed of the screw driver 50 at a prescribed timing in the temporary seating process.

However, the PLC 10 may determine the screw fastening failure on the basis of a speed feature value relating to the axial speed of the screw driver 50 at a prescribed timing in the temporary seating process.

Figure 6:
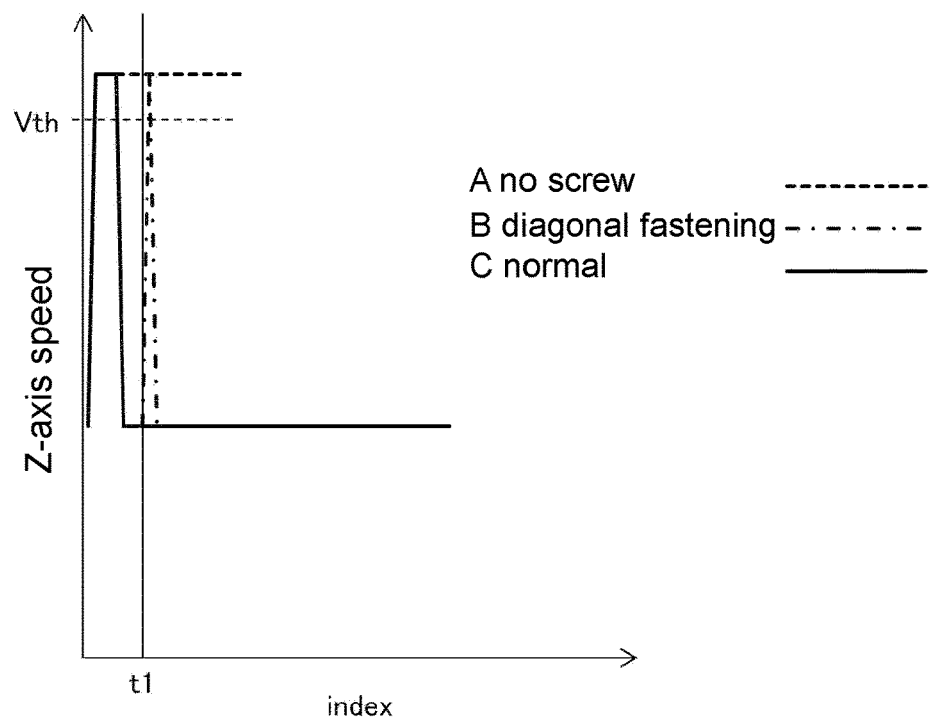
FIG. 6 is a diagram schematically showing the amount of change in the Z-axis speed during the temporary seating process.

FIG. 6 schematically shows the amount of change in the Z-axis speed of the screw driver 50 during the temporary seating process. In FIG. 6, the horizontal axis represents index indicating the time, and the vertical axis represents the Z-axis speed of the screw driver 50. As described above, in the temporary seating process, when the screw starts to be screwed into the screw hole, the speed of the screw driver 50 decreases sharply (reference character C in FIG. 6). On the other hand, the speed of the screw driver 50 does not change when the failure due to no screw occurs (reference character A in FIG. 6). Thus, the screw fastening failure is determined by comparing the axial speed of the screw driver 50 at an appropriate timing t1 with a threshold value of speed that is preset. Specifically, when the speed of the screw driver 50 at the timing t1 is equal to or smaller than the threshold value, it is determined that the situation is normal, and when the speed of the screw driver 50 at the timing t1 is greater than the threshold value, it is determined that the failure due to no screw occurs.

On the other hand, the screw may be diagonally fastened although the failure due to no screw does not occur. Diagonal fastening occurs when the screw driver 50 holds the screw diagonally with respect to the screw hole. Even if diagonal fastening occurs, the screw fastening is performed to the end. The diagonal fastening should be distinguished from the failure due to no screw. When diagonal fastening occurs, the speed of the screw driver 50 decreases sharply at the timing at which the screw abuts against the side surface of the screw hole. However, after that, the speed of the screw driver 50 may temporarily increase again when the inclined screw is diagonally pressed into the screw hole (reference character B in FIG. 6). At the timing at which the speed increases again, when the screw fastening failure is determined by taking the speed of the screw driver 50 as the reference and comparing the speed of the screw driver 50 with the threshold value, it may be erroneously determined that the failure due to no screw occurs.

On the other hand, the PLC 10 may determine the presence/absence of the screw fastening failure on the basis of the feature value relating to the speed (speed feature value) instead of the axial speed of the screw driver 50 in the determination of the screw fastening failure. The speed feature value may be, but not limited to, for example, the cumulative movement average value, movement average value, median value, standard deviation, or the like of the speed of the screw driver 50 during a prescribed period of the temporary seating process, as illustrated in the following Embodiments 2 to 5.

When the screw fastening failure is determined using the speed feature value, the speed acquisition unit 13 and the failure determination unit 14 have the following configuration as an example. Because the other configurations of the screw fastening failure determination device are the same as those in Embodiment 1, the description is not repeated.

(Speed Acquisition Unit 13)

The speed acquisition unit 13 may receive, via the communication unit 12, the information of the axial speed of the screw driver 50 acquired by the servo motor or the like, and the speed feature value in a prescribed period may be calculated by the speed acquisition unit 13. After that, the speed acquisition unit 13 transmits the calculated speed feature value to the failure determination unit 14.

In addition, the servo screw driver that controls the servo motor may calculate the speed feature value in a prescribed period from the axial speed of the screw driver 50, and the speed acquisition unit 13 may receive the calculated speed feature value from the servo motor or the like. Then, the speed acquisition unit 13 may transmit the calculated speed feature value to the failure determination unit 14.

Here, as the prescribed period, a suitable period is set within the period from the start of lowering of the screw driver 50 to the completion of the temporary seating process according to the speed feature value selected respectively. The prescribed period is preset by the user and is set in the speed acquisition unit 13.

(Failure Determination Unit 14)

The failure determination unit 14 determines whether or not the failure due to no screw occurs on the basis of the speed feature value received from the speed acquisition unit 13. For example, by comparing the magnitude of the acquired feature value with the threshold value corresponding to each feature value that is preset and stored in the storage unit, it is determined whether or not the failure due to no screw occurs.

Hereinafter, specific embodiments are described.

Embodiment 2

In the embodiment, the failure determination unit 14 determines whether or not the screw fastening fails on the basis of the cumulative movement average value of the axial speed at a prescribed timing. The speed acquisition unit 13 acquires the speed of the screw driver 50 in the axial direction and calculates the cumulative movement average value of the speed in a prescribed period. The failure determination unit 14 may determine the screw fastening failure by comparing the cumulative movement average value of the speed with the preset threshold value of the cumulative movement average value. As the prescribed period, a period including the period before the timing at which the temporary seating process is completed under normal conditions may be set. For example, the prescribed period is a period from the start of the temporary seating process to the present timing. For example, when the cumulative movement average value of the speed exceeds the threshold value, the failure determination unit 14 determines that the failure due to no screw occurs, and when the cumulative movement average value of the speed is equal to or smaller than the threshold value, the failure determination unit 14 determines that the failure due to no screw does not occur.

Figure 7:
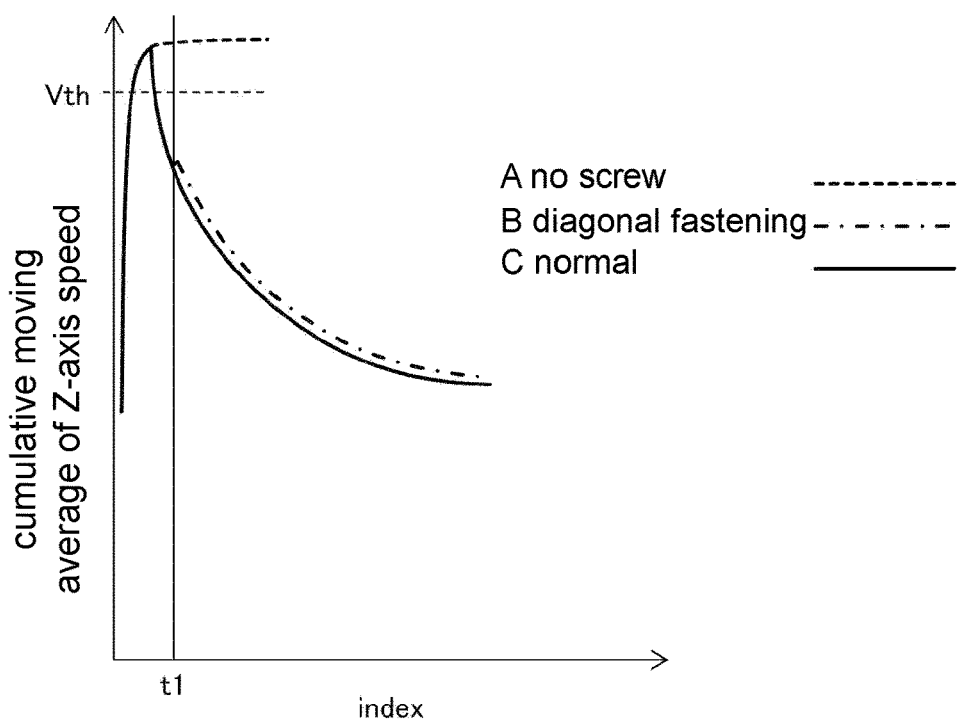
FIG. 7 is a diagram schematically showing the amount of change in a cumulative movement average of the Z-axis speed during the temporary seating process.

FIG. 7 is a graph schematically showing the transition of the amount of change in a cumulative movement average value $V_{CMA}$ of the axial speed of the screw driver 50 calculated by the speed acquisition unit 13, the index indicating the time is shown on the horizontal axis, and the cumulative movement average value $V_{CMA}$ of the axial speed of the screw driver 50 is shown on the vertical axis.

When the screw fastening is normally performed without the occurrence of the failure due to no screw, the screw is pressed against the screw hole by the motion of the ball screw 60 and is screwed into the screw hole, and thus after the temporary seating process is started, the axial speed of the screw driver 50 increases and then decreases. From the axial speed of the screw driver 50 in the prescribed period, the speed acquisition unit 13 calculates the cumulative movement average value $V_{CMA}$ in the period. The cumulative movement average value $V_{CMA}$ begins to decrease along with the decrease of the speed at the timing at which the screw begins to be screwed into the screw hole (reference character C in FIG. 6).

On the other hand, when the failure due to no screw occurs, the axial speed of the screw driver 50 does not decrease (remains increased) until the timing at which the front end of the screw driver 50 reaches the object to be fastened. As a result, the cumulative movement average value $V_{CMA}$ of the axial speed of the screw driver 50 increases after the start of the temporary seating process and remains high (reference character A in FIG. 7).

Thus, at the prescribed timing t1 after a certain period from the start of the temporary seating process, the failure determination unit 14 can compare the cumulative movement average value $V_{CMA}$ of the speed of the screw driver 50 with a threshold value $V_{th}$ of the cumulative movement average value that is set, determine that the failure due to no screw occurs when $V_{CMA}>V_{th}$, and determine that the situation is normal when $V_{CMA} \leq V_{th}$.

In addition, when the screw is diagonally fastened, the speed of the screw driver 50 temporarily decreases at the timing at which the screw that is diagonally screwed into the screw hole abuts against the side surface of the screw hole. However, after that, when the diagonally fastened screw is pressed into the screw hole, the speed of the screw driver 50 may increase temporarily. Thus, in this case, as shown by a curve B in FIG. 7, the cumulative movement average value $V_{CMA}$ of the axial speed of the screw driver 50 is slightly greater than a cumulative movement average value of the speed in the normal case, but shows substantially the same change. Thus, in the case of diagonal fastening, the cumulative movement average value of the speed of the screw driver 50 in a prescribed period is a value smaller than the threshold value, and thus the failure determination unit 14 is unlikely to erroneously determine that there is no screw.

In this way, the cumulative movement average value $V_{CMA}$ of the speed of the screw driver 50 at a prescribed timing (for example, the timing t1 shown in FIG. 7) is compared with the set threshold value $V_{th}$, and whether or not the failure due to no screw occurs can be determined by whether or not $V_{CMA}$ is greater than $V_{th}$.

In addition, when determining the failure due to no screw, if the determination is made on the basis of the cumulative movement average value $V_{CMA}$ of the axial speed of the screw driver 50, it can be determined whether or not the failure due to no screw occurs at the early stage of the temporary seating process. Moreover, it is unlikely that the failure different from no screw, such as diagonal fastening or the like, is erroneously determined as the failure due to no screw. Furthermore, the timing t1, at which the cumulative movement average value $V_{CMA}$ of the speed is compared with the threshold value for failure determination, may be arbitrarily set within the period from the timing at which the temporary seating process is started under normal conditions until the screw driver 50 reaches the object to be fastened. Therefore, it is also easy to set the optimum speed measurement period in order to prevent erroneous determination.

Embodiment 3

In the embodiment, the failure determination unit 14 determines whether or not the screw fastening fails on the basis of the movement average value of the axial speed at a prescribed timing. The speed acquisition unit 13 acquires the axial speed of the screw driver 50 in a prescribed period, and calculates a movement average value $V_{MA}$ of the speed in a fixed period that is suitable within the prescribed period as the feature value of the axial speed of the screw driver 50. The failure determination unit 14 may determine the occurrence of the failure due to no screw by comparing the movement average value $V_{MA}$ with the threshold value $V_{th}$ of the speed movement average value that is set. Here, the fixed period is a fixed period from the present timing to the past.

As described above, when the screw fastening is normally performed, the axial speed of the screw driver 50 decreases sharply at the timing at which the screw starts to be screwed into the screw hole. Therefore, the movement average value $V_{MA}$ of the axial speed of the screw driver 50 also decreases sharply from the timing. However, when the failure due to no screw occurs, the axial speed of the screw driver 50 does not decrease, and thus the movement average value $V_{MA}$ of the axial speed of the screw driver 50 does not decrease either. Thus, at the timing at which the screw starts to be screwed into the screw hole under normal conditions, the movement average value $V_{MA}$ of the axial speed of the screw driver 50 is compared with the threshold value $V_{th}$ of the speed movement average value that is set, and thereby it can be determined that the failure due to no screw occurs when $V_{MA} > V_{th}$, and it can be determined that the situation is normal when $V_{MA} \leq V_{th}$.

In addition, when diagonal fastening occurs as described above, the speed of the screw driver 50 may temporarily increase, but the speed movement average value shows substantially the same change as in the normal case. Thus, it is unlikely that the failure due to diagonal fastening is erroneously determined as the failure due to no screw.

In this embodiment, because the movement average value of the speed is used as the feature value of the speed of the screw driver 50, the movement average value $V_{MA}$ of the speed decreases sharply at the timing at which the screw starts to be screwed into the screw hole. Thus, it can be determined whether or not the failure due to no screw occurs at the early timing of the temporary seating process. In addition, it is unlikely that the failure due to diagonal fastening is erroneously determined as the failure due to no screw, and a suitable no-screw determination can be performed.

Embodiment 4

In the embodiment, the failure determination unit 14 determines whether or not the screw fastening fails on the basis of the median value of the axial speed at a prescribed timing. The median value is, for example, a median value in a prescribed period from a certain timing after the start of the temporary seating process to the prescribed timing t1. In the embodiment, a median value $V_m$ of the speed may be used as the feature value of the axial speed of the screw driver 50 and compared with the threshold value $V_{th}$ of the speed median value, the median value $V_m$ of the speed being the median value of the speed when the axial speed of the screw driver 50 is measured in a prescribed period and the measured speeds are arranged in an ascending order. When $V_m > V_{th}$, it can be determined that the failure due to no screw occurs, and when $V_m \leq V_{th}$, it can be determined that the situation is normal.

In the embodiment, at the timing at which the screw is started to be screwed into the screw hole, the median value $V_m$ of the speed also starts to decrease as the axial speed of the screw driver 50 decreases sharply. On the other hand, when the failure due to no screw occurs, the speed does not decrease, and thus the median value $V_m$ does not change either. In addition, in the case of diagonal fastening, as described above, the speed of the screw driver 50 may temporarily increase, but this has almost no influence on the median value of the speed. Thus, it is unlikely that the failure due to diagonal fastening is erroneously determined as the failure due to no screw.

Embodiment 5

In the embodiment, the failure determination unit 14 determines whether or not the screw fastening fails on the basis of the standard deviation of the axial speed at a prescribed timing. In the embodiment, the axial speed of the screw driver 50 in a prescribed period is measured, and a standard deviation S of the speed in the period is calculated. In the normal case, the value of the standard deviation S increases until the speed of the screw driver 50 approaches an upper limit speed, decreases after the speed of the screw driver 50 approaches the upper limit speed, and increases from the start of screwing the screw into the screw hole until the speed is stabilized at a small value. On the other hand, when the failure due to no screw occurs, the screw driver 50 is lowered in the axial direction at the same speed as before even after the timing at which the screw is screwed in under normal conditions. Therefore, the value of the standard deviation S remains small after the speed of the screw driver 50 reaches the upper speed limit. Thus, a threshold value $S_{th}$ of the standard deviation is set, it can be determined that the failure due to no screw occurs when the standard deviation $S < S_{th}$, and it can be determined that the situation is normal when the standard deviation $S \geq S_{th}$, the standard deviation S being the standard deviation until the timing at which the screw is screwed in under normal conditions.

As described above, the speed of the screw driver 50 may increase temporarily, but this has little influence on changes in the standard deviation of the speed. Thus, it is unlikely that the failure due to diagonal fastening is erroneously determined as the failure due to no screw.

Moreover, when no-screw determination is performed, speed dispersion or the like may be used instead of the standard deviation of the axial speed of the screw driver 50.

As described above, in order to determine the failure due to no screw, the standard deviation or the like of the axial speed of the screw driver 50 in a prescribed period is taken as the basis instead of the axial speed of the screw driver 50, and the failure due to no screw can be suitably determined with high precision at the early stage of the temporary seating process. In addition, the failure due to diagonal fastening is not erroneously determined as the failure due to no screw.

SUMMARY

[Aspect 1]

A screw fastening failure determination device, including: a speed acquisition unit which acquires an axial speed of a screw driver or a speed feature value relating to the speed; and a failure determination unit which determines, in a temporary seating process in which the screw driver is made to move to a screw hole side and a screw is inserted into the screw hole, whether or not screw fastening fails on the basis of the axial speed or the speed feature value at a prescribed timing.

According to the above configuration, the screw fastening failure is determined on the basis of the feature value of the axial speed of the screw driver at a prescribed timing in the temporary seating process. In the temporary seating process, a clear speed change occurs as soon as the screw starts to enter the object to be fastened. Therefore, at an early timing in the temporary seating process, the feature value of the measured speed can be calculated, and the determination of screw fastening failure, in which whether or not the screw exists at the front end of the screw driver is determined, can be performed with high precision on the basis of the speed feature value.

[Aspect 2]

The screw fastening failure determination device according to Aspect 1, wherein the failure determination unit determines whether or not the screw fastening fails on the basis of the speed feature value in the axial direction at a prescribed timing, and the speed feature value is a cumulative movement average of the axial speed of the screw driver.

According to the above configuration, the occurrence of the failure due to no screw can be detected with high precision. In addition, it is possible to suitably detect no screw at an early stage without erroneously determining the diagonal fastening or the like as no screw.

[Aspect 3]

The screw fastening failure determination device according to Aspect 1, wherein the failure determination unit determines whether or not the screw fastening fails on the basis of the speed feature value in the axial direction at a prescribed timing, and the speed feature value is a movement average of the axial speed of the screw driver.

According to the above configuration, the failure of no screw can be detected with high precision at an early stage.

[Aspect 4]

The screw fastening failure determination device according to Aspect 1, wherein the failure determination unit determines whether or not the screw fastening fails on the basis of the speed feature value in the axial direction at a prescribed timing, and the speed feature value is a median value of the axial speed of the screw driver.

According to the above configuration, the failure of no screw can be detected with high precision at an early stage.

[Aspect 5]

The screw fastening failure determination device according to Aspect 1, wherein the failure determination unit determines whether or not the screw fastening fails on the basis of the speed feature value in the axial direction at a prescribed timing, and the speed feature value is a standard deviation of the axial speed of the screw driver.

According to the above configuration, the failure of no screw can be detected with high precision at an early stage.

[Aspect 6]

The screw fastening failure determination device according to Aspect 1, wherein the failure determination unit determines whether or not the screw fastening fails on the basis of the axial speed at a prescribed timing.

According to the above configuration, the failure of no screw can be detected with high precision at an early stage.

[Aspect 7]

The screw fastening failure determination device according to any one of aspects 1 to 6, wherein the temporary seating process is a process until the seat surface of the screw comes into contact with an object to be fastened.

[Aspect 8]

The screw fastening failure determination device according to any one of aspects 1 to 7, wherein the temporary seating process is performed until a rotation torque applied to the screw driver reaches a prescribed torque smaller than a fastening torque of the screw.

[Aspect 9]

The screw fastening failure determination device according to any one of aspects 1 to 8, including a notification unit that notifies the occurrence of failure in which the screw does not exist at the front end of the screw driver when it is determined that the screw fastening fails.

According to the above configuration, the occurrence of the failure in which the screw does not exist at the front end of the screw driver can be notified, and the user can take suitable solutions such as attaching the screw to the front end of the screw driver or the like.

[Aspect 10]

A screw fastening device, comprising: the screw fastening failure determination device according to any one of aspects 1 to 9; a first motor which applies a rotation torque to the screw driver; and a second motor which makes the screw driver move in the axial direction.

According to the above configuration, the temporary seating process can be controlled on the basis of the rotation torque of the first motor, and the screw fastening failure can be determined according to the axial speed of the screw driver determined by the second motor or the speed feature value relating to the speed. Thus, the screw fastening failure can be determined in the temporary seating process.

[Aspect 11]

The screw fastening device according to Aspect 10, which stops the screw fastening when it is determined that the screw fastening fails.

According to the above configuration, in the case of no screw, the driving of the screw driver can be stopped before the bit of the screw driver abuts against the object to be fastened, and thus the bit of the screw driver can be prevented from damaging the object to be fastened.

[Aspect 12]

A screw fastening failure determination method, including: a speed acquisition step in which an axial speed of a screw driver or a speed feature value relating to the speed is acquired; and a failure determination step in which in a temporary seating process where the screw driver is made to move to the screw hole side and a screw is inserted into the screw hole, whether or not screw fastening fails is determined on the basis of the axial speed or the speed feature value at a prescribed timing.

According to the above configuration, the screw fastening failure is determined on the basis of the axial speed or the speed feature value of the screw driver at a prescribed timing in the temporary seating process. In the temporary seating process, a clear speed change occurs as soon as the screw starts to enter the object to be fastened. Therefore, at an early timing in the temporary seating process, the feature value of the measured speed can be calculated, and the determination of screw fastening failure, in which whether or not the screw exists at the front end of the screw driver is determined, can be performed with high precision on the basis of the speed or the speed feature value.

[Aspect 13]

A control program, which is configured to make a computer function as the screw fastening failure determination device according to any one of aspects 1 to 9, and is configured to make the computer function as the speed acquisition unit and the failure determination unit.

According to the above configuration, the screw fastening failure can be determined with high precision by the control program.

[Implementation Example by Software]

The control block of the PLC 10 (particularly the control unit 11, the communication unit 12, the speed acquisition unit 13, the failure determination unit 14, and the notification unit 15) may be implemented by a logic circuit (hardware) formed in an integrated circuit (IC chip) or the like, or may be implemented by software.

In the latter case, the PLC 10 includes a computer that executes the instructions of a program that is software implementing each function. The computer includes, for example, one or more processors and includes a computer-readable recording medium that stores the program. Then, in the computer, the processor reads the program from the recording medium and executes the program, thereby achieving the aim of the present invention. As the processor, for example, a central processing unit (CPU) can be used. As the recording medium, a "non-temporary tangible medium", for example, a tape, a disk, a card, a semiconductor memory, a programmable logic circuit, or the like in addition to a read only memory (ROM) or the like can be used. In addition, a random access memory (RAM) or the like for expanding the program may be further included. In addition, the program may be supplied to the computer via an arbitrary transmission medium (a communication network, a broadcast wave, or the like) capable of transmitting the program. Moreover, one aspect of the present invention can also be implemented in the form of a data signal embedded in a carrier wave, in which the above program is embodied by electronic transmission.

The present invention is not limited to each of the embodiments described above, various modifications can be made within the scope of the claims, and embodiments obtained by appropriately combining the technical solutions respectively disclosed in the different embodiments are also included in the technical scope of the present invention.

REFERENCE SIGNS LIST

1 screw fastening device
10 PLC (screw fastening failure determination device)
11 control unit
12 communication unit
13 speed acquisition unit
14 failure determination unit
15 notification unit
30 servo for rotation (first motor)
40 servo for reciprocation (second motor)
50 screw driver

What is claimed is:

1. A screw fastening failure determination device, comprising:
   a speed acquisition unit which acquires a speed in an axial direction of a screw driver or a speed feature value relating to the speed; and
   a failure determination unit which determines, in a temporary seating process in which the screw driver is made to move to a screw hole side and a screw is inserted into the screw hole, whether or not screw fastening fails based on the speed in the axial direction or the speed feature value at a prescribed timing.

2. The screw fastening failure determination device according to claim 1, wherein the failure determination unit determines whether or not the screw fastening fails based on the speed feature value in the axial direction at a prescribed timing, and
   the speed feature value is a cumulative movement average of the speed in the axial direction of the screw driver.

3. The screw fastening failure determination device according to claim 1, wherein the failure determination unit determines whether or not the screw fastening fails based on the speed feature value in the axial direction at a prescribed timing, and
   the speed feature value is a movement average of the speed in the axial direction of the screw driver.

4. The screw fastening failure determination device according to claim 1, wherein the failure determination unit determines whether or not the screw fastening fails based on the speed feature value in the axial direction at a prescribed timing, and
   the speed feature value is a median value of the speed in the axial direction of the screw driver.

5. The screw fastening failure determination device according to claim 1, wherein the failure determination unit determines whether or not the screw fastening fails based on the speed feature value in the axial direction at a prescribed timing, and
   the speed feature value is a standard deviation of the speed in the axial direction of the screw driver.

6. The screw fastening failure determination device according to claim 1, wherein the failure determination unit determines whether or not the screw fastening fails based on the speed in the axial direction at a prescribed timing.

7. The screw fastening failure determination device according to claim 1, wherein the temporary seating process is a process until a seat surface of the screw comes into contact with an object to be fastened.

8. The screw fastening failure determination device according to claim 1, wherein the temporary seating process is performed until a rotation torque applied to the screw driver reaches a prescribed torque smaller than a fastening torque of the screw.

9. The screw fastening failure determination device according to claim 1, comprising a notification unit that notifies an occurrence of failure in which the screw does not exist at a front end of the screw driver when it is determined that the screw fastening fails.

10. A screw fastening device, comprising: the screw fastening failure determination device according to claim 1;
- a first motor which applies a rotation torque to the screw driver; and
- a second motor which makes the screw driver move in the axial direction.

11. The screw fastening device according to claim 10, which stops the screw fastening when it is determined that the screw fastening fails.

12. A screw fastening failure determination method, comprising: a speed acquisition step in which a speed in an axial direction of a screw driver or a speed feature value relating to the speed is acquired; and
- a failure determination step in which in a temporary seating process where the screw driver is made to move to a screw hole side and a screw is inserted into the screw hole, whether or not screw fastening fails is determined based on the speed in the axial direction or the speed feature value at a prescribed timing.

13. A non-transitory computer readable medium, storing a control program, which is configured to make a computer function as the screw fastening failure determination device according to claim 1, and is configured to make the computer function as the speed acquisition unit and the failure determination unit.

* * * * *